(12) United States Patent
Cunningham et al.

(10) Patent No.: US 6,347,571 B1
(45) Date of Patent: Feb. 19, 2002

(54) RADIAL PISTON MOTOR WITH FRICTION BRAKE

(75) Inventors: Sinclair Cunningham, Kinghorn (GB); Peter Wuesthof, Lohr am Main (DE)

(73) Assignee: Mannesmann Rexroth AG, Lohr am Main (DE)

( * ) Notice: Subject to any disclaimer, the term of this patent is extended or adjusted under 35 U.S.C. 154(b) by 0 days.

(21) Appl. No.: 09/581,159

(22) PCT Filed: Oct. 21, 1998

(86) PCT No.: PCT/EP98/06679

§ 371 Date: Jun. 12, 2000

§ 102(e) Date: Jun. 12, 2000

(87) PCT Pub. No.: WO99/30030

PCT Pub. Date: Jun. 17, 1999

(30) Foreign Application Priority Data

Dec. 11, 1997 (DE) .......................... 197 55 156

(51) Int. Cl.[7] .............. F01B 13/04; F01B 1/00; F01B 1/06; F04B 49/00
(52) U.S. Cl. .............. 91/472; 91/473; 91/491; 417/214
(58) Field of Search ............ 91/472, 473, 491; 417/214

(56) References Cited

U.S. PATENT DOCUMENTS

| 3,913,454 A | * | 10/1975 | Nelson ................. 91/491 |
| 5,099,964 A | * | 3/1992 | Cunningham et al. ...... 188/170 |
| 5,697,286 A | * | 12/1997 | Grahl .................. 92/24 |

FOREIGN PATENT DOCUMENTS

| DE | 26 25 327 | 12/1996 |
| GB | 2 231 370 | 11/1990 |
| GB | 2 261 710 | 5/1993 |
| WO | WO 94/18451 | 8/1994 |

\* cited by examiner

Primary Examiner—Charles G. Freay
Assistant Examiner—Michael K. Gray
(74) Attorney, Agent, or Firm—Oblon, Spivak, McClelland, Maier & Neustadt, P.C.

(57) ABSTRACT

A drive device which has small dimensions an axial and radial directions. The small dimensions of the device are a result of a brake body of a friction brake provided in the drive device being located at least partially within an enclosure configured in a rotor.

15 Claims, 6 Drawing Sheets

RADIAL PISTON MOTOR WITH FRICTION BRAKE

BACKGROUND OF THE INVENTION

1. Field of the Invention

The present invention relates to drive devices with a hydrostatic motor and a combined friction brake, and can be used for machine tools, mobile working appliances and the like. The present invention relates in particular to a drive device equipped with a radial piston motor according to the multi-stroke principle and a multiple plate brake.

2. Discussion of the Background

Hydrostatic motors within the meaning of the present invention comprise substantially a rotor and a stator, a mount for the rotor in the stator, an output shaft connected to the rotor and a controller for distribution of hydraulic fluid to cylindrical spaces in the rotor. These components are disposed around a geometric axis and fixed relative to each other in the direction of this axis. Radial piston motors, for which the present invention is preferably applied, also have a stroke ring as an element of the stator, a rotor disk as an element of the rotor, in which there are disposed the cylindrical spaces in substantially radial arrangement, and pistons, which are disposed movably in the cylindrical spaces and are braced via rollers against the stroke ring.

The function of friction brakes is to prevent (stopping brake) or limit (operating brake) relative rotation between rotor and stator. Friction brakes within the meaning of the present invention are, for example, multiple plate brakes with a brake-plate assembly, the output-side brake plates, which are fixed via a driver toothing such that they cannot turn relative to the rotor, and stator-side brake plates, which are fixed via a driver toothing such that they cannot turn relative to the stator. Via the elastic force of a spring-and-piston arrangement as a further element of the multiple plate brake, pressure is exerted on the brake-plate assembly comprising the output-side and stator-side brake plates such that the output-side and stator-side brake plates are pushed against one another, thus leading to activation of the multiple plate brake, or in other words to immobilization of the rotor during stoppage of the drive device or to braking of the rotor during operation of the drive device. Via a fluid pressure acting on the spring-and-piston arrangement in the sense opposite to the elastic force, the brake-plate assembly is relieved, thus releasing the multiple plate brake.

Such drive devices are the subject matter of constant development toward reduction of both the radial and axial space requirement thereof. In this connection, the geometry and/or arrangement of the friction brake has a decisive influence, apart from that of the geometry of the rotor mount, on the outside dimensions of the drive device both in radial and axial direction.

Drive devices with a hydrostatic motor and a multiple plate brake according to the features described in the foregoing are disclosed, for example, in German Laid-Open Applications DE A 19504451, DE A 4407563 and DE A 4311997.

In the drive device of German Laid-Open Application DE A 19504451, the brake plates of the multiple plate brake are disposed radially outside a bearing of the mount for the output shaft in such a way that they axially overlap at least part of the bearing. Such placement of the disk plates certainly does not require too much space for the drive device in axial direction, but needs a relatively large amount of space in radial direction in order to house the brake plates, the output-side driver toothing and the stationary driver toothing.

In the drive device known from German Laid-Open Application DE A 4407563, the brake plates of the multiple plate brake are disposed axially adjoining the casing of the hydrostatic motor; thus little space in radial direction but a considerable amount of space in axial direction is needed for placement of the brake plates and the two driver toothings.

The same observation is substantially true also for the drive device known from German Laid-Open Application DE A 4311997, and so this drive device will not be further explained at this place.

The object of the present invention is therefore to provide a drive device with a hydrostatic motor and a combined friction brake, which is characterized by a compact and simple structure with dimensions which in both axial and radial direction are small compared with those of conventional drive devices.

SUMMARY OF THE INVENTION

This object is achieved by a drive device according to the features of claim 1. According to the present invention, the brake body of the friction brake is disposed at least partly in an enclosure formed in the rotor. The placement of the brake body in the manner described in the foregoing therefore does not on the whole add to either the axial or the radial extent of the drive device. Furthermore, a drive device with compact and simple structure is achieved by such placement of the brake body.

A conventional multiple plate brake with a brake-plate assembly as the brake body is one example of a suitable friction brake. Of course, friction brakes with a disk-like brake body (disk brakes) or friction brakes with a drum-like brake body (drum brakes) are also possible if the enclosure has appropriate geometry. In principle, any brake having a brake body which can be disposed at least partly in an enclosure in the rotor and which can prevent or limit relative rotation between rotor and stator is conceivable.

The brake body can have arbitrary form. As regards placement of the brake body, the following options are available: The brake body can be disposed "to float" in the enclosure and be provided with two friction faces that can be brought into frictional contact with corresponding friction faces on the rotor side and stator side. It is also possible, however, for the brake body to have one friction face and be in interlocking contact either with the stator or with the rotor, in which case the friction face of the brake body can then be brought into frictional contact with a corresponding friction face on the rotor or stator.

Further advantageous features of the drive device according to the invention are subject matter of the dependent claims.

As regards a simple and inexpensive alternative version of a drive device according to the invention, an already existing axial recess in the rotor, especially the axial recess for the output shaft, is used as the enclosure for placement of the brake body. Since such placement of the brake body does not have any influence on the other components provided in the drive device, components of conventional drive devices can be used in this case. Naturally this is also possible when the brake body is not disposed in the already present axial recess, but is placed in an enclosure formed specifically in the rotor for the brake body, thus contributing substantially to reduction of the costs for the drive device.

The brake body of the friction brake is preferably disposed between the rotor and a shank which is held such that it cannot turn relative to the stator but can be moved axially. The shank extends to the rotor and supports the brake body.

For actuation of the friction brake, the drive device can also be provided with a spring-and-piston arrangement, as is also used in conventional drive devices. Such spring-and-piston arrangements are usually housed in a brake casing fastened to the stator. The piston of the spring-and-piston arrangement is connected to the shank and forms two chambers in the casing. In one of the two chambers there is disposed a spring, which exerts on the piston a pressure in a first direction, for example in brake actuation direction. The other chamber can be filled with hydraulic fluid, by means of which there can be applied on the piston a pressure in a second direction, for example in brake release direction. Naturally it would also be possible to actuate the brake via the hydraulic fluid and to release it via the elastic force of the spring.

As already mentioned hereinabove, there can be used as friction brake a multiple plate brake, which is provided with a brake-plate assembly with at least one output-side brake plate and one stator-side brake plate. In this case there is advantageously formed in the enclosure in the rotor a driver toothing for the at least one output-side brake plate and on the shank a driver toothing for the at least one stationary brake plate. When the recess for the output shaft is used as the enclosure, naturally the already present internal toothing can be used as the driver toothing for the at least one output-side brake plate. Naturally it also would be conceivable to form the driver toothing not directly in the enclosure of the rotor or on the shank, but via further devices connected to the rotor or the shank such that they cannot turn relative thereto.

When the driver toothing is formed on the shank, the at least one brake plate seated on the driver toothing of the shank can be braced either directly on the shank or on a bush disposed on the shank.

A brake body within the meaning of the present invention is, however, also a brake body formed in one piece with the rotor and provided with a friction face which can be brought into frictional contact with a corresponding stator-side friction face. For example, there can be regarded as the brake body a surface-layer region enclosing the surface of the rotor disk and formed at the surface as a friction face, which can be brought into frictional contact with a corresponding stator-side friction face. The surface-layer region can be, for example, a coated or hardened region of the rotor-disk surface having a certain depth. The material of the rotor disk surrounding this region then corresponds to the enclosure for the region of the rotor disk regarded as the brake body.

BRIEF DESCRIPTION OF THE DRAWINGS

Further features of the present invention will become apparent from the description hereinafter of a preferred practical example with reference to the drawing, wherein.

DESCRIPTION OF THE PREFERRED EMBODIMENTS

Figure 1:
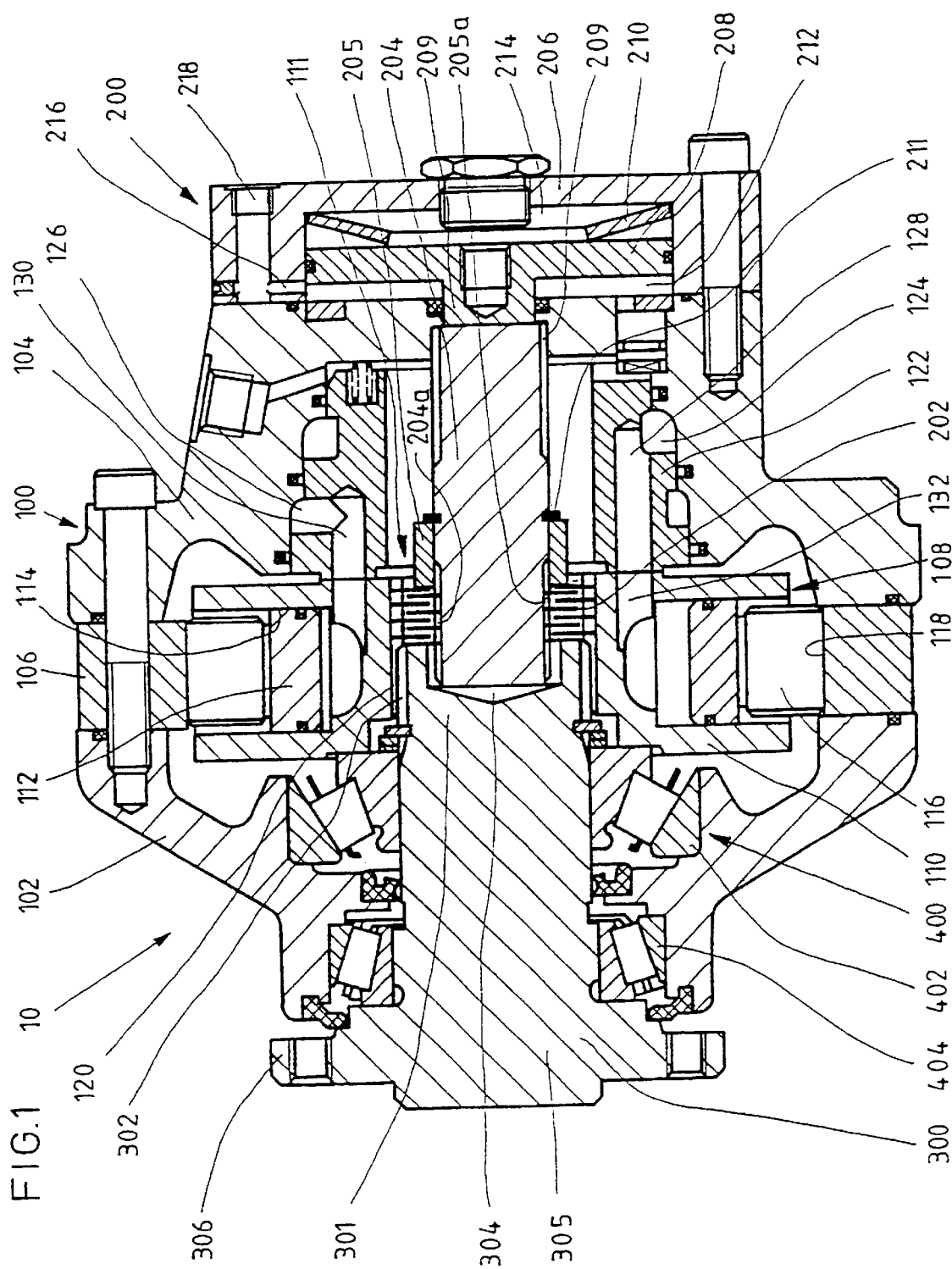
FIG. 1 shows a longitudinal cross section through a radial piston motor with combined multiple plate brake according to a preferred embodiment of the invention.

Referring now to FIG. 1 there will be described the preferred embodiment of the drive device according to the invention.

As can be seen in FIG. 1, drive device 10 is provided with a hydrostatic motor 100, a friction brake 200, an output shaft 300 and a mount 400 for the output shaft.

In this practical example, hydrostatic motor 100 is a conventional radial piston motor according to the multistroke principle. Since the design of such a hydrostatic motor is substantially known, it will be outlined only briefly hereinafter.

As shown in FIG. 1, hydrostatic motor 100 comprises substantially a stator as well as a rotor 108 housed in a stroke ring 106. The stator comprises substantially two casing parts 102 and 104 and stroke ring 106. Rotor 108 comprises a rotor disk 110, pistons 112 directed outwardly in a star-like configuration, and rollers 116. Pistons 112 are disposed in cylindrical spaces 114, which are formed in radial direction in rotor disk 110 and are braced via rollers 116 on curved track 118 of stroke ring 106.

Reference symbol 122 denotes a controller fixed in casing 104 such that it cannot turn relative thereto for distribution of a hydraulic fluid to cylindrical spaces 114. The controller is provided with two circumferential grooves 124 and 126 separated from one another by fluid-tight means, the said grooves being in communication with fluid channels 128 and 130 respectively. During operation of the hydrostatic motor, fluid channels 128 and 130 communicate in alternation with fluid channels 132, which are formed in rotor disk 110 and at the same time communicate with one of the cylindrical spaces 114.

Rotor disk 110 is provided with a centrally formed axial recess 111, which corresponds to the enclosure and has an internal toothing 120. Into this axial recess 111 there protrudes from the left side of the rotor in FIG. 1 an end portion 301 of output shaft 300. End portion 301 of output shaft 300 is provided with an external toothing 302, which engages with internal toothing 120 of rotor disk 110, whereby output shaft 300 is connected with rotor disk 110 such that it cannot turn relative thereto. End portion 301 of output shaft 300 is provided with an axial internal bore 304 which, as shown in FIG. 1, extends from the right end face of output shaft 300 into output shaft 300.

As shown in FIG. 1, output shaft 300 is provided on left end portion 305 with a shaft flange or flange portion 306, which is provided with fastening threads for establishing a connection to a drive element (not illustrated), such as the gear of a loader.

Output shaft 300 is supported in hydrostatic motor 100 by means of a mount 400. Mount 400 comprises correspondingly conventional drive devices of two bevel-type rolling bearings 402 and 404 which, as shown in FIG. 1, are housed in casing part 102 of the hydrostatic motor and can transmit large axial and radial forces.

Friction brake 200 is designed in this practical example as a multiple plate brake. It comprises a plate assembly 202 as a brake body, a shank 204, a brake casing 206 and a spring-and-piston arrangement 208, 210.

The brake casing 206 is fastened to the right end side of the casing part 104 of the stator, so as to form an intergral unit with the stator.

The plate assembly comprises output-side brake plates (external plates), which are connected interlockingly with the rotor via internal toothing 120 (driver toothing), as well as stator-side brake plates (internal plates) which, via an external toothing 204a formed on an end portion of shank 204, are connected with shank 204 in such a way that they cannot turn relative thereto. Each of the two surfaces of each brake disk is provided with a friction face. The plate assembly corresponds to the brake body of the present invention. According to the basic concept of the present invention, the plate assembly is disposed in the axial recess for output shaft 300 of rotor disk 110, which recess corresponds to the enclosure, and thereby takes advantage of space which is present in any case in the drive device. Thus the multiple plate brake leads neither to radial broadening of the drive device nor to disproportionate axial lengthening of the drive device.

As can be seen in FIG. 1, the stator-side brake plates of plate assembly 202 are disposed via external toothing 204a (driver toothing) on shank 204. The portion of shank 204 provided with the external toothing, or in other words the left portion in FIG. 1, protrudes into axial internal bore 304 of portion 301 of output shaft 300. The other end portion of shank 204, or in other words the right end portion, extends into an opening formed in the end face of casing part 104 and is disposed such that it can be moved axially relative to casing part 104, in other words the stator, via an appropriate connection between casing and shank, such as a spline profile connection. On the side of the portion with external toothing 204a of shank 204 there is seated a bush 205. Bush 205 has a contact face 205a, against which there are braced the brake plates of plate assembly 202. Bush 205 is secured by a retaining ring 211 against slipping in a direction away from the rotor disk, or in other words to the right in FIG. 1.

According to the design described in the foregoing, plate assembly 202 (the brake body) of multiple plate brake 200 (of the friction brake) is generally disposed between the rotor disk 110 and the stator side, and especially within recess 111 of the rotor disk 110 and between the output shaft 300, the shank 204, and the bush 205.

Spring-and-piston arrangement 208, 210 is housed in brake casing 206 of multiple plate brake 200. Piston 208 forms two chambers 212, 214 in brake casing 206, chamber 212 being sealed fluid-tight. A centrally disposed axial portion 209 of piston 208 also extends into the opening at the end face of casing part 104. Central portion 209 of piston 208 can merely abut against shank 204 or can be connected thereto interlockingly and frictionally. A cup spring 210 is disposed in chamber 214, which faces away from hydrostatic motor 100 and otherwise can also be open to the outside atmosphere. By virtue of the elastic force of cup spring 210, piston 208 and thus shank 204 is urged toward the left in FIG. 1, whereby pressure is exerted on the plate assembly, which in FIG. 1 is braced at the left against the output shaft, whereby the brake plates are pushed against one another. Thereby the friction faces of the brake plates are brought into frictional contact with one another, and so a torque can be transmitted. In this way multiple plate brake 200 is actuated. Cup spring 210 corresponds to the spring of the present invention.

The chamber facing hydrostatic motor 100 has the function of a fluid chamber, which can be filled with hydraulic fluid via a port 218 and a fluid channel 216. If chamber 212 is filled with hydraulic fluid, piston 208 is moved to the right in FIG. 1, against the elastic force of cup spring 210. In this way the plate assembly is relieved and the frictional connection between the brake plates is eliminated. Thereby multiple plate brake 200 is released.

The operation of the drive device will be briefly explained hereinafter. During operation of the drive device, pistons 112 are activated via fluid channels 124, 126, 128, 130 and 132 by means of a hydraulic fluid in such a way that rotor disk 110 performs a rotational movement. The direction of rotation is selected by the mode of activation. Pistons 112 are hereby urged radially outward and become braced via rollers 116 against curved track 118 of stroke ring 106. By virtue of the interlocking connection of output shaft 300 to rotor disk 110, the rotational movement and the torque of rotor 108 are transmitted to output shaft 300. This is braced via mounts 402 and 404 of mount 400. A drive element, such as a gear of a loader (not illustrated here in more detail), which is connected to output shaft 300 via the fastening threads in flange portion 306, is therefore driven and set in rotation.

Naturally operation of the drive device is possible only if multiple plate brake 200 is released. As already mentioned hereinabove, this is achieved in that piston 208 is acted on by hydraulic fluid, which passes via port 218 and fluid channel 216 into fluid chamber 212. In the event of a disturbance or of a sudden pressure drop in the system, the drive device is automatically braked, in that piston 208, urged by the elastic force of cup spring 210, presses via shank 204 and bush 205 on the brake disks of the plate assembly.

The placement according to the invention of plate assembly 202 in the axial recess in the rotor creates a drive device with both axially and radially minimal dimensions. In the case of the drive device shown in FIG. 1, standard parts of conventional drive devices can be used to a great extent, and so the structural complexity and thus the costs for the drive device are minimal.

The practical example described in the foregoing represents the preferred embodiment of the drive device according to the invention. The present invention is not limited merely to this practical example, however, but can also be executed in other ways.

In FIGS. 2 to 6 described hereinafter, further possible embodiments of the drive device are illustrated as examples, like components being denoted by the same reference symbols as used in FIG. 1. It is emphasized that the features illustrated in the practical examples of FIGS. 1 to 6 can be combined with each other to the extent technically possible.

Figure 2:
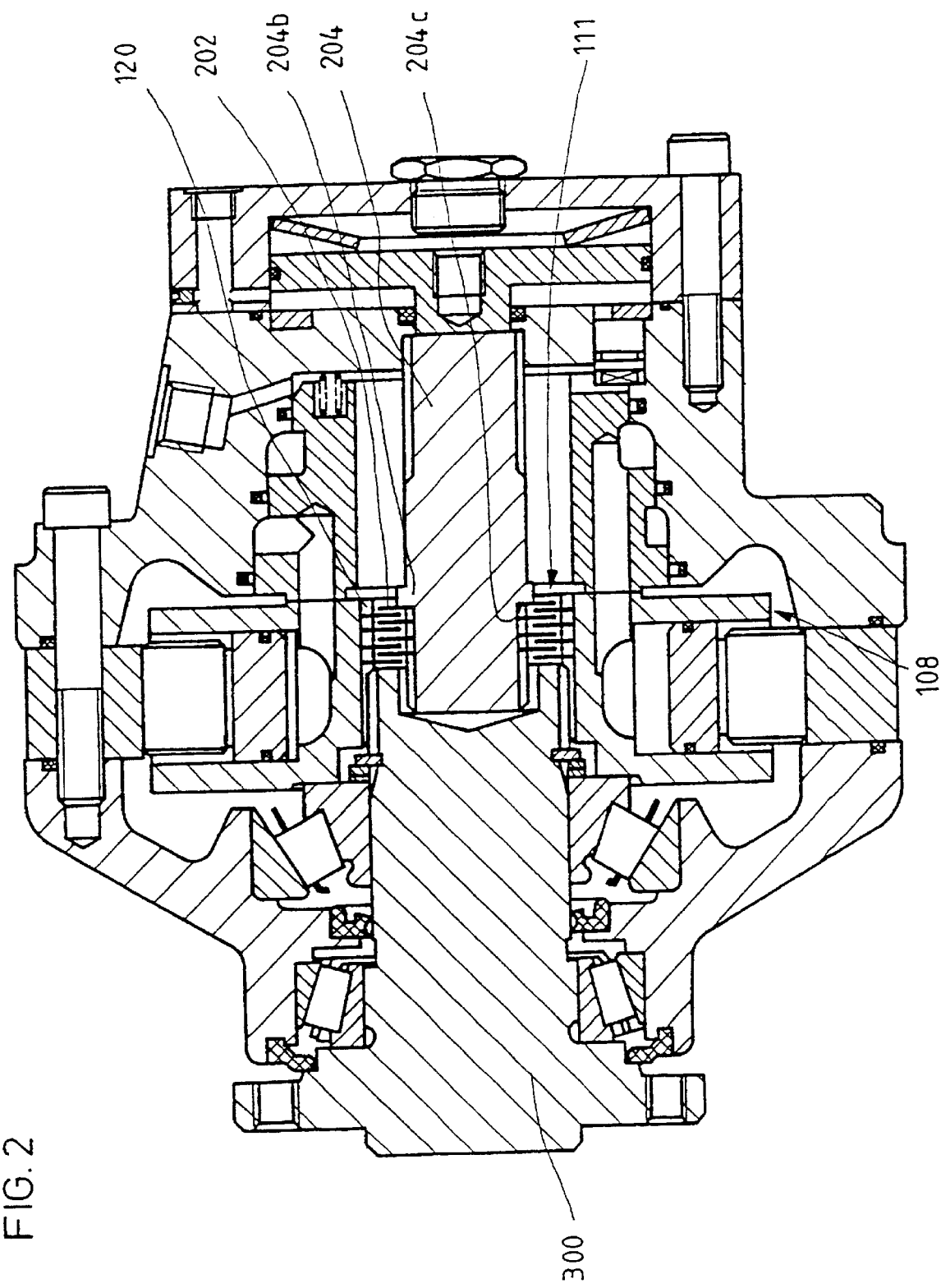
FIG. 2 shows a longitudinal cross section through a radial piston motor with combined multiple plate brake according to a second embodiment of the invention.

Whereas the stator-side brake plates in the first practical example according to FIG. 1 are braced against contact face 205a of bush 205 seated on shank 204, it is also possible to provide contact face 204c for the brake plates on a ring 204b formed in one piece with the shank. This is illustrated in FIG. 2.

Figure 3:
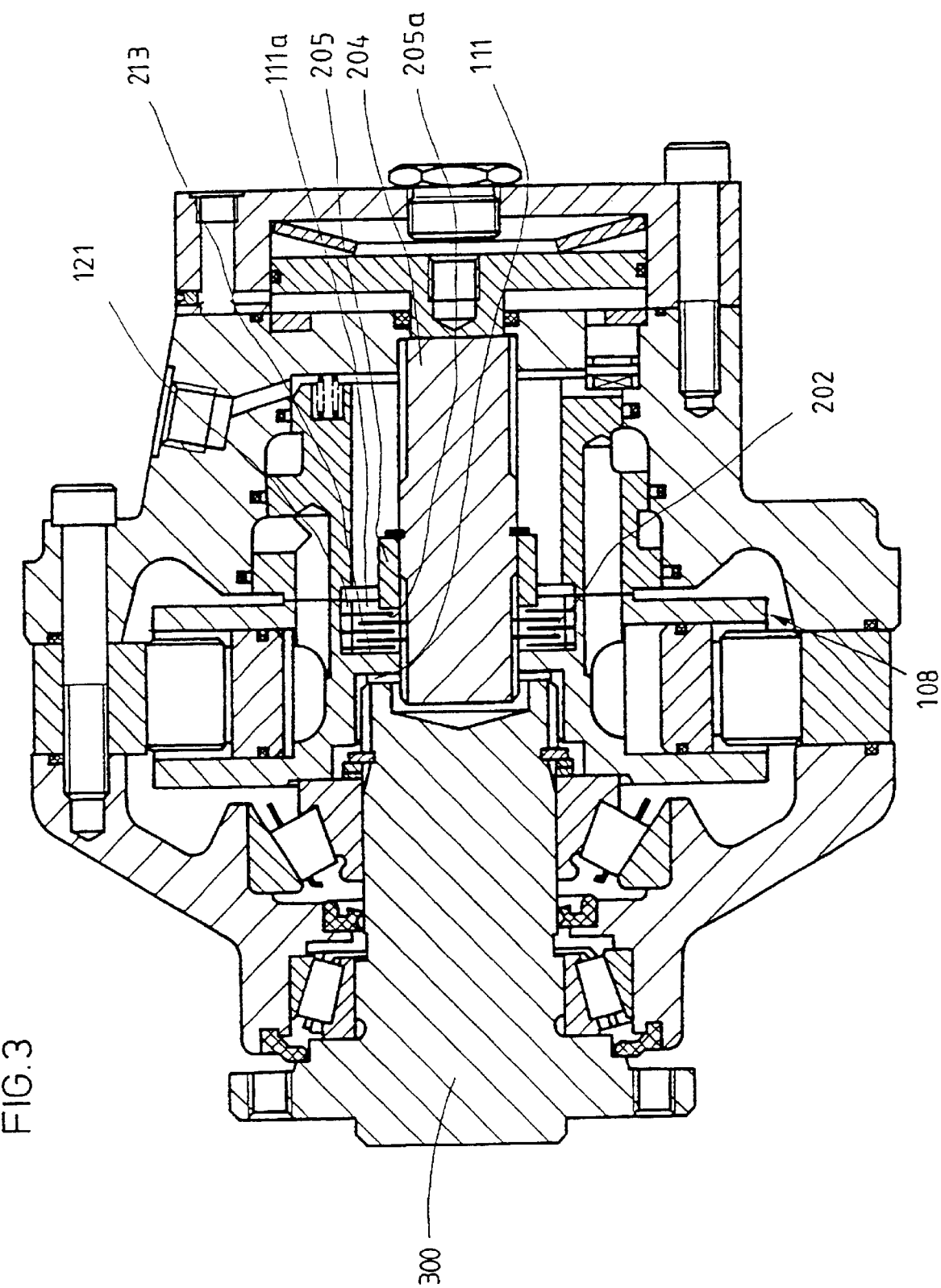
FIG. 3 shows a longitudinal cross section through a radial piston motor with combined multiple plate brake according to a third embodiment of the invention.

In the first practical example according to FIG. 1, the axial recess formed for the output shaft in the rotor disk is used as the enclosure for the output-side brake plates. As shown in FIG. 3, the output-side brake plates can also be disposed in a recess 111a, which is formed specifically for the purpose and which has a diameter different from the diameter of axial recess 111 for the output shaft. In this case axial recess 111a is provided, as shown in FIG. 3, with a contact or friction face 213 for bracing the brake plates.

Although in the practical examples described in the foregoing, the brake-plate assembly as the brake body is disposed completely in an axial recess of the rotor, the brake-plate assembly can also be disposed such that the brake plate adjoining the contact face of the shank or of the bush is located outside the axial recess of the rotor, provided this brake plate is a stator-side brake plate.

Figure 4:
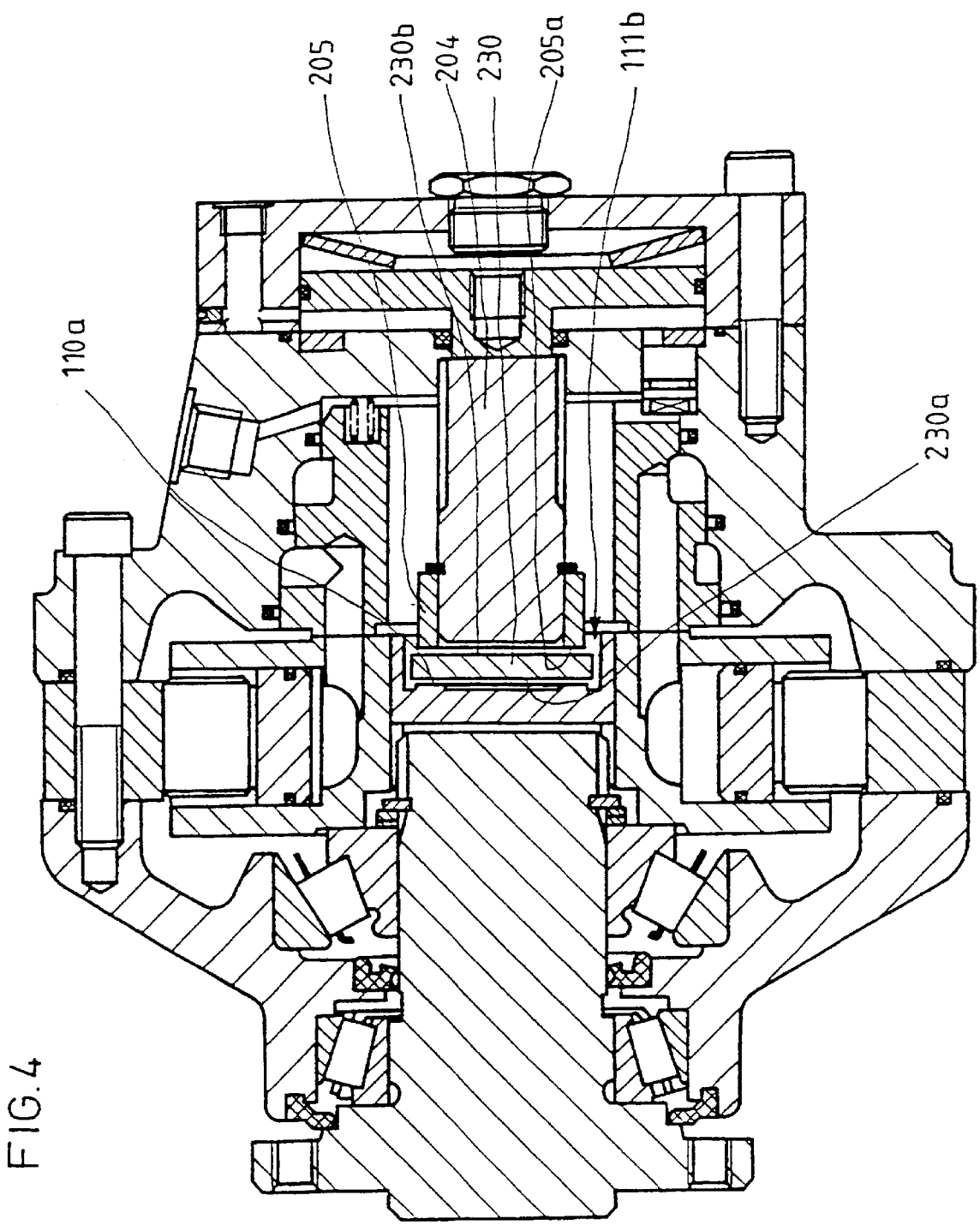
FIG. 4 shows a longitudinal cross section through a radial piston motor with combined multiple plate brake according to a fourth embodiment of the invention.

In the practical examples described in the foregoing, a multiple plate brake is used as the friction brake and a plurality of brake plates as the brake body. The drive device according to the invention is not limited, however, merely to such a friction brake. A different friction brake with a (single) brake body can also be used instead of the plurality of brake plates. In this case the brake body can have the form of a brake disk, an example of which is shown in FIG. 4. The two surfaces 230a and 230b of brake disk 222 are then constructed as friction faces, which can be brought into frictional contact with corresponding friction faces 110a on rotor disk 110 and 205a on bush 205. Although one of the friction faces is formed on bush 205 here, this friction face (although not shown in FIG. 4) naturally can also be provided directly on shank 204.

Figure 5:
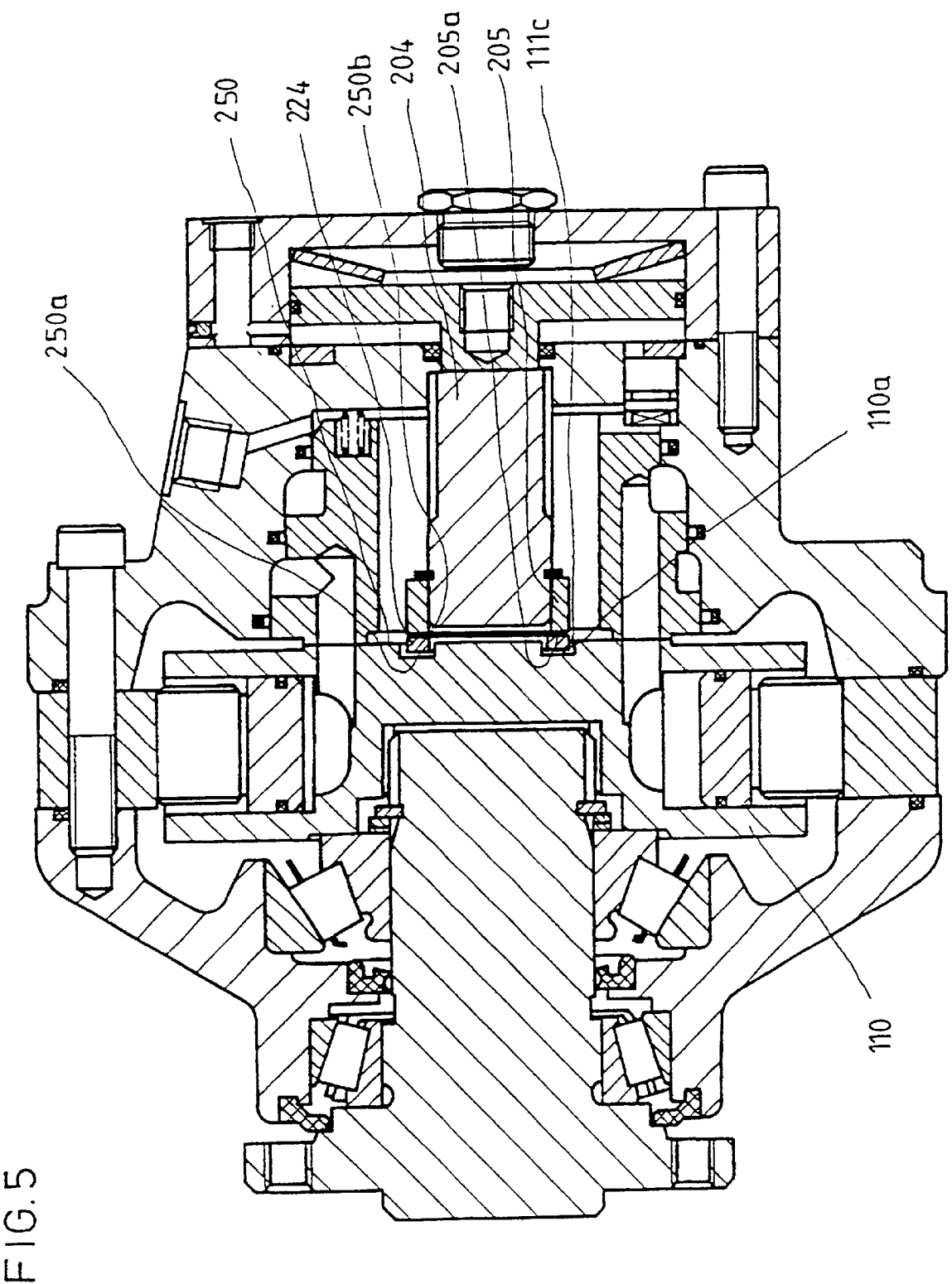
FIG. 5 shows a longitudinal cross section through a radial piston motor with combined multiple plate brake according to a fifth embodiment of the invention.

The brake body can also have the form of an annular disk 224, as is shown in FIG. 5. This annular disk is disposed immovably in an annular recess 111c of rotor disk 110 and is provided on the free surface with a friction face 250b, which can be brought into contact with a corresponding friction face 205a on bush 205 (or even directly on shank 204) and with a corresponding friction face 110a on the rotor.

In each of the cases described in the foregoing, the friction face or contact face formed directly on the shank or on a bush seated on the shank is matched to the brake body.

As shown in FIGS. 3, 4 and 5, the axial recess for the output shaft does not absolutely have to pass through rotor disk 110. It is also possible for the axial recess for the output shaft to extend only a certain distance into the rotor disk. The enclosure for the brake body is formed at the free side of the rotor disk not reached by the axial recess, and so the enclosure is not limited to a certain geometry or size but—naturally with allowance for the material thicknesses required for strength and the placement of the further components in the drive device—can be adapted appropriately to the respective requirements, for example for generating a specified braking torque.

Figure 6:
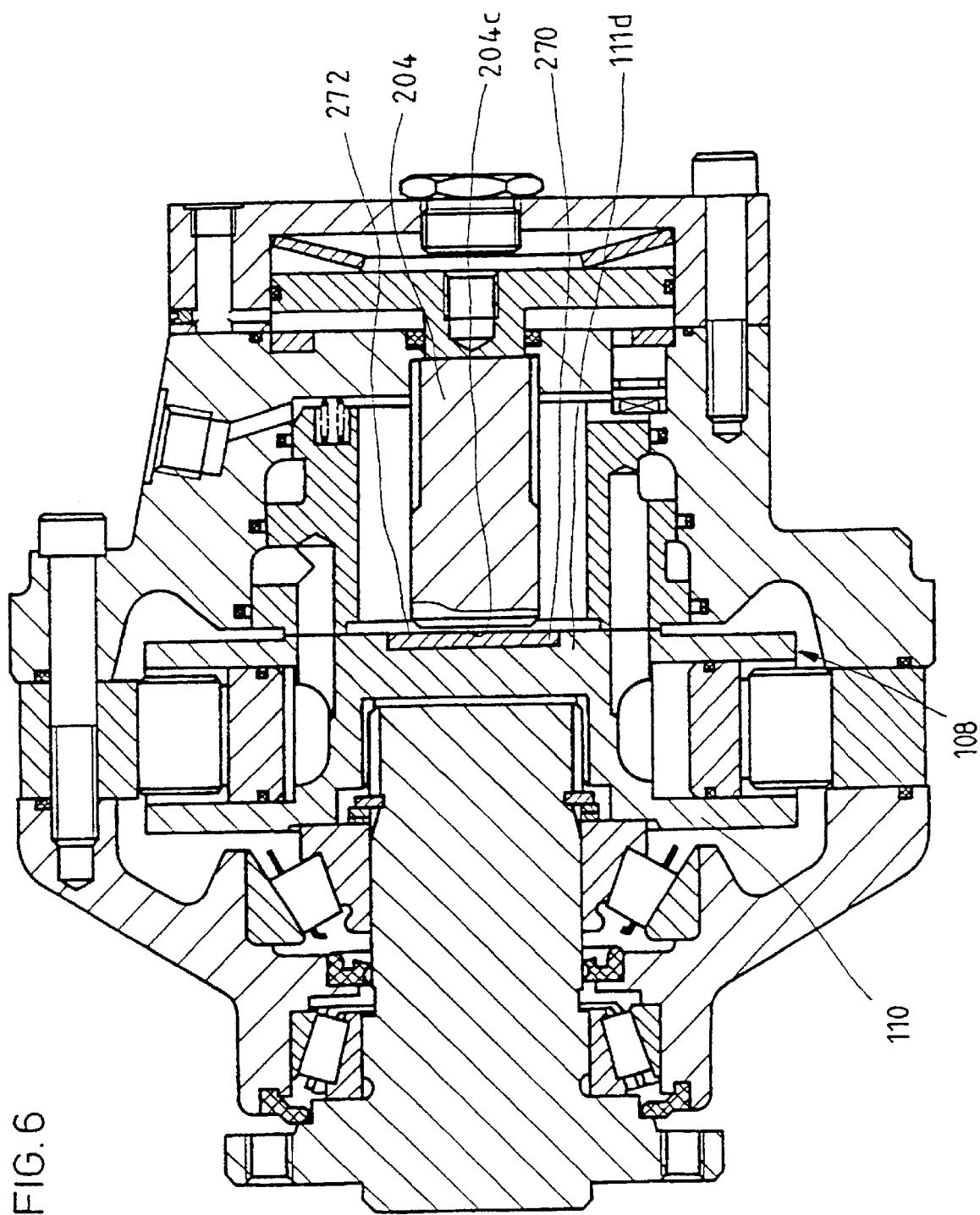
FIG. 6 shows a longitudinal cross section through a radial piston motor with combined multiple plate brake according to a sixth embodiment of the invention.

FIG. 6 shows a further embodiment of the present invention, wherein the brake body is constructed as a region 270 enclosing the surface of the end wall of rotor disk 110. In this case, therefore, brake body 270 is formed in one piece with rotor disk 110. Shank 204 (or, although not illustrated, a bush seated on the shank) naturally is then provided with a corresponding friction face 204c. The material of rotor disk 110 surrounding region 270 is used as enclosure 111d for region 270 functioning as the brake body.

Although the present invention has been described only in connection with radial piston motors, it is expressly pointed out at this place that the present invention can also be applied in connection with other hydrostatic motors, for example axial piston motors.

The present invention therefore provides a drive device 10 with small dimensions in axial and also radial direction. This is achieved by the fact that brake body 202 of a friction brake 200 provided in the drive device is disposed at least partly in an enclosure 111 formed in rotor 108.

What is claimed is:

1. A drive device for a hydrostatic motor comprising:
    a stator;
    a rotor with an enclosure formed therein;
    an output shaft connected to the rotor;
    a mount configured to support the output shaft so that the output shaft is rotatable with the rotor;
    a friction brake provided with a brake body disposed at least partly in the enclosure formed in the rotor; and
    a shank axially oriented with the output shaft, said shank actuating the brake body.

2. A drive device according to claim 1, wherein the enclosure is an axial recess.

3. A drive device according to claim 1, wherein the enclosure is a recess extending through the rotor and engagingly receiving the output shaft.

4. A drive device according to claim 1, wherein the shank is adapted to be moved axially relative to the output shaft and further wherein the brake body is disposed at least partly between the rotor and the shank.

5. A drive device according to claim 1, wherein the friction brake is further provided with a spring-and-piston arrangement which is connected to the shank and which exerts on the shank a pressure in a first direction.

6. A drive device according to claim 5, wherein the friction brake is further provided with a brake casing which is fastened to the stator and in which the spring-and-piston arrangement is housed, said piston of the spring-and-piston arrangement forming with the brake casing a fluid-tight chamber which can be filled with hydraulic fluid that exerts on the spring-and-piston arrangement a pressure in a second direction opposite to the first direction.

7. A drive device according to claim 6, wherein the first direction corresponds to a brake actuation direction and the second direction corresponds to a brake release direction.

8. A drive device according to claim 1, wherein the brake body is connected to the rotor and is provided with a friction face which can be brought into frictional contact with a corresponding friction face on the shank.

9. A drive device according to claim 1, wherein the brake body is connected to the shank and is provided with a friction face which can be brought into frictional contact with a corresponding friction face on the rotor.

10. A drive device according to claim 1, wherein the brake body is provided with at least two friction faces, each of which can be brought into frictional contact with corresponding friction faces on the rotor and on the shank.

11. A drive device according to claim 1, wherein the brake body includes a plurality of brake plates.

12. A drive device according to claim 11, wherein the plurality of brake plates includes at least one brake plate disposed on a driver toothing formed in the enclosure and at least another brake plate disposed on a driver toothing formed on the shank.

13. A drive device according to claim 1, wherein the shank supports an axially fixed bush against which one side of the brake body is braced.

14. A drive device according to claim 1, wherein one side of the brake body is braced directly against the shank.

15. A drive device according to claim 1, wherein the brake body is formed in one piece with the rotor.

* * * * *